(12) United States Patent
Choisnet

(10) Patent No.: US 6,490,510 B1
(45) Date of Patent: Dec. 3, 2002

(54) FIXED MULTIFUNCTION PROBE FOR AIRCRAFT

(75) Inventor: Joel Choisnet, Naveil (FR)

(73) Assignee: Thales Avionics S.A., Velizy Villacoublay (FR)

( * ) Notice: Subject to any disclaimer, the term of this patent is extended or adjusted under 35 U.S.C. 154(b) by 0 days.

(21) Appl. No.: 09/959,589

(22) PCT Filed: Apr. 28, 2000

(86) PCT No.: PCT/FR00/01162
§ 371 (c)(1),
(2), (4) Date: Oct. 30, 2001

(87) PCT Pub. No.: WO00/67039
PCT Pub. Date: Nov. 9, 2000

(30) Foreign Application Priority Data

Apr. 30, 1999  (FR) ............................................ 99 05545

(51) Int. Cl.$^7$ .............................................. G01C 21/00
(52) U.S. Cl. ......................... 701/14; 73/180; 73/170.02
(58) Field of Search .............................. 701/14; 73/180, 73/170.02, 202, 780, 862.337

(56) References Cited

U.S. PATENT DOCUMENTS

| | | | | |
|---|---|---|---|---|
| 4,096,744 A | * | 6/1978 | De Leo et al. | 73/180 |
| 4,378,696 A | * | 4/1983 | DeLeo et al. | 73/180 |
| 4,718,273 A | * | 1/1988 | McCormack | 73/180 |
| 4,797,603 A | | 1/1989 | Choisnet | 324/678 |
| 4,972,725 A | | 11/1990 | Choisnet | 73/862.337 |
| 5,010,775 A | | 4/1991 | Choisnet | 73/862.337 |
| 5,406,839 A | | 4/1995 | Leblond et al. | 73/180 |
| 6,091,335 A | | 7/2000 | Breda et al. | 340/580 |

* cited by examiner

Primary Examiner—William A. Cuchlinski, Jr.
Assistant Examiner—Marthe Y. Marc-Coleman
(74) Attorney, Agent, or Firm—Oblon, Spivak, McClelland, Maier & Neustadt, P.C.

(57) ABSTRACT

A fixed multifunction probe, e.g., for aircraft and configured to measure air flow parameters near an airplane. The probe includes a body closed by a rounded cap, at least three pressure taps situated at specified positions of the body, a pressure measurement mechanism for measuring at least as many pressures as pressure taps, and a calculation device for calculating the air flow parameters.

11 Claims, 4 Drawing Sheets

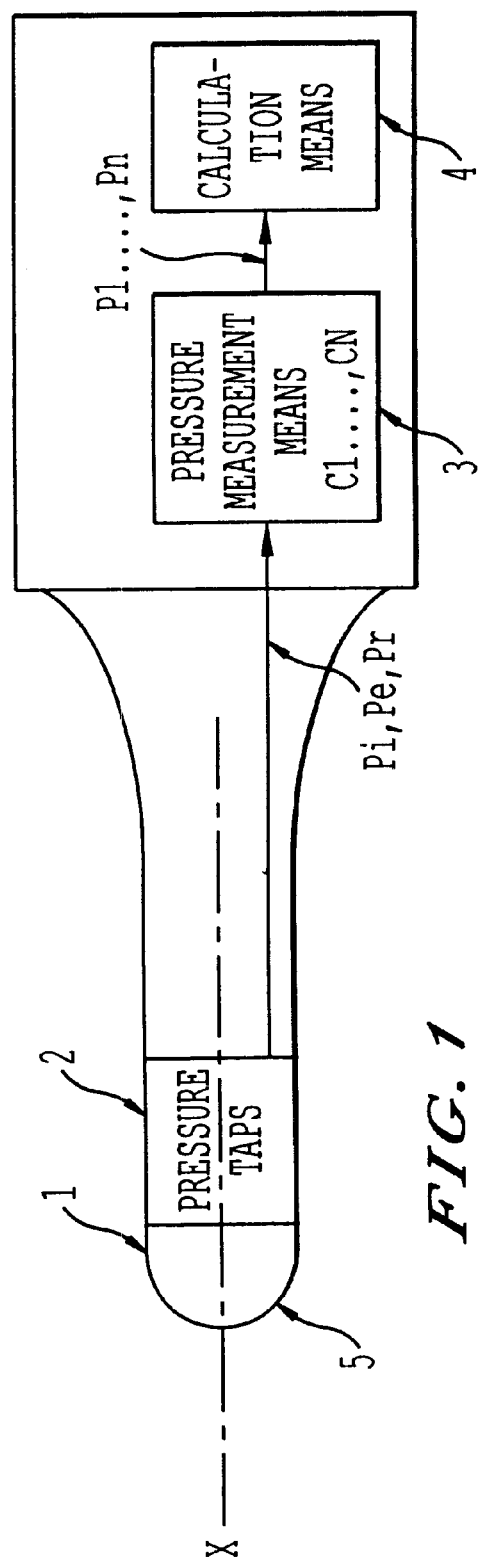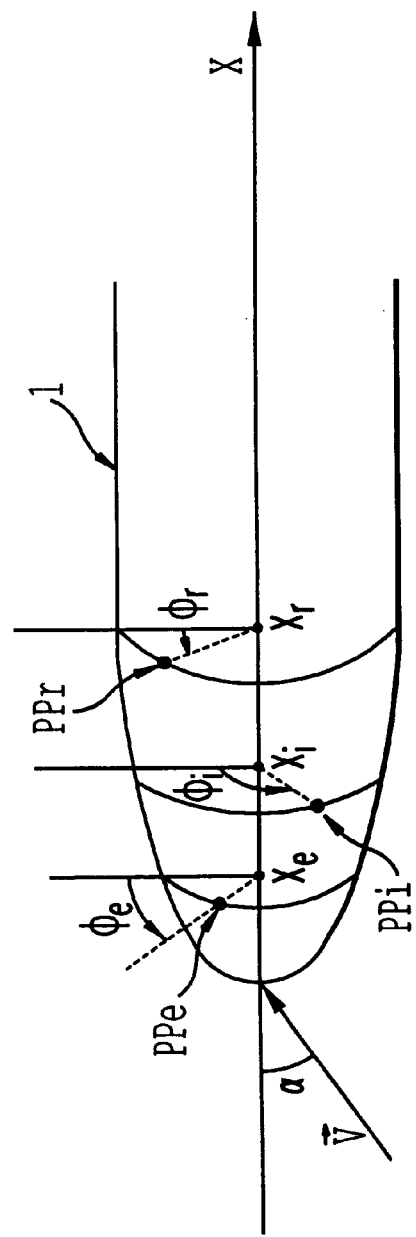

FIXED MULTIFUNCTION PROBE FOR AIRCRAFT

BACKGROUND OF THE INVENTION

1. Field of the Invention

The present invention relates to a multifunction probe intended for measuring the static and total pressures, as well as the angle of attack of the flow of a fluid near an aircraft. The probe is especially intended for measuring the flow parameters of the air near an airplane.

2. Discussion of the Background

The static pressure is a very important parameter for the safety of an airplane. An international standard establishes a correspondence between the static pressure and the altitude. This correspondence is used to associate an aircraft with an altitude in a unique manner by allocating it a static pressure value to be complied with during the flight thereof.

The total pressure is not utilized as it stands, but it makes it possible to determine the dynamic pressure by calculating the differential pressure between the total pressure and the static pressure. The dynamic pressure is a very important parameter since it makes it possible to determine the velocity of the air flow; the velocity of the air flow coming into play, for its part, in calculating the lift of the airplane.

The pressure measurements are performed by way of pressure taps. The first known probes were equipped with a single pressure tap. This limitation compelled the use of several probes in order to be able to perform the various pressure measurements.

The configuration customarily adopted comprises:

a static pressure probe for measuring the local static pressure Ps a total pressure probe for measuring the total pressure Pt and a vane for measuring the local angle of attack $\alpha$.

With such a configuration, the calculation of the parameters, static pressure Ps, total pressure Pt and local angle of attack $\alpha$, requires the accurate knowledge on the one hand of the characteristics of the three probes, and on the other hand of the aerodynamic field of the airplane at the points of position of the probes on the fuselage. Furthermore, each probe requires its de-icing system.

To remedy these drawbacks, the person skilled in the art may resort to a multifunction probe. A multifunction probe advantageously makes it possible to measure the above parameters at one and the same point of the airplane. Optimization of the position of the probe eases the calculations. The use of a multifunction probe makes it possible to reduce the number of probes, and consequently, it makes it possible to reduce the heating power required for de-icing. There are various types of multifunction probe.

A first type encompasses moveable multifunction probes. A probe of this type comprises a moveable part, generally referred to as the vane, which positions itself in the direction of the air stream and which carries static and total pressure taps. The manufacture of probes of this type presents significant difficulties. The vane compels a complex mechanical link with the fixed part of the probe. The link must allow rotation of the vane while ensuring continuity of the pressure ducts between the vane and the fixed part, while this continuity must not exhibit any leaks. Sealing is therefore difficult to achieve since it must be compatible with the rotation of the vane.

A second type encompasses fixed multifunction probes. A typical probe is described in the patent U.S. Pat. No. 4,096,744. This probe comprises pressure taps distributed at various locations of the probe. This distribution gives the possibility, after calculation, of accessing the altitude, velocity and angle of attack information. However, this probe comprises a total pressure tap Pt at the front extremity of the probe; this tap is often referred to by the name "Pitot". The Pitot tap renders the nose of the probe fragile. U.S. Pat. No. 5,628,565 describes an elaborate probe which is capable, simultaneously, of measuring various pressures and of measuring the temperature of the air stream. However, this probe is also equipped with a Pitot tap which renders the nose of the probe fragile.

An aim of the invention is to provide a fixed multifunction probe for aircraft which does not have the drawback recalled above.

BRIEF SUMMARY OF THE INVENTION

Accordingly, the subject of the invention is a fixed multifunction probe for aircraft having a closed front part and having at least three pressure taps distributed in various sections at specified points of the body of the probe. The fixed multifunction probe according to the invention makes it possible to measure the flow parameters of the fluid moving with respect to the probe. To this end, it comprises:

a body having symmetry of revolution about a longitudinal axis, closed by a rounded cap, the body being placed in the flow, at least three pressure taps situated at specified points of the body and distributed in various sections so as to tap a first pressure, a second pressure and a third pressure, pressure measurement means associated with the pressure taps for measuring at least as many pressures P1, ..., Pn as pressure taps, calculation means for calculating the local angle of attack $\alpha$ of the flow by expressing a specified ratio of measured pressures as a function of the local angle of attack a in the form:

$$\frac{P1-P2}{P1+P2} = \frac{A + B \cdot \cos2\alpha + C \cdot \sin2\alpha}{D + E \cdot \cos2\alpha + F \cdot \sin2\alpha}$$

A, B, C, D, E, F being constants dependent solely on the coordinates of the pressure taps, the specified position of the pressure taps being such that the expression for the ratio as a function of the local angle of attack $\alpha$ is quasi linear, and for calculating the total pressure Pt of the flow at the level of the probe, the static pressure at upstream infinity of the probe $Ps_\infty$ and the dynamic pressure $Pt-Ps_\infty$ from the pressure coefficients kP of the pressure taps.

By virtue of the absence of any Pitot pressure tap, a probe according to the invention is more robust than a fixed multifunction probe equipped with such a tap. Furthermore, the absence of a Pitot tap makes it possible to free up some room for installing a heating circuit, thereby making it possible to improve the de-icing of the extremity of the probe.

The fixed structure of the probe eases the inspection of the integrity of the probe before flight as well as the transmission of the heating energy and the pneumatic pressures. The structure of the probe allows installation at the nose of the airplane, in a similar manner to the installation of a nose boom, and also installation along the fuselage, by way of a mast acting as support and by way of a fixing pad.

According to a first embodiment of the invention, the probe comprises three pressure taps. The pressure taps are associated with pressure measurement means and with calculation means. The probe makes it possible to retrieve the local angle of attack, the total pressure and the static pressure of the aerodynamic flow in which it is placed. Advantageously the probe comprises no total pressure tap.

According to a second embodiment of the invention, the probe comprises a fourth pressure tap associated with pressure measurement means. Such a probe also makes it possible to retrieve the parameters listed above (local angle of attack, total pressure and static pressure of the flow), but with a securing of the information which the first embodiment does not allow. A fault with one of the pressure taps, or with one of the pressure measurement means, may be detected and signaled on completion of a comparison between the various values calculated from the various measurements. As in the first embodiment, the probe comprises no total pressure tap.

BRIEF DESCRIPTION OF THE SEVERAL VIEWS OF THE DRAWINGS

The invention will be well understood and its advantages and other characteristics will emerge from the following description presented by way of non-limiting illustration. The description is given in conjunction with the appended figures which represent:

FIG. 1, a schematic representation of a fixed multifunction probe according to the invention, FIG. 2, a schematic representation of the arrangement of the pressure taps of a probe according to the invention, FIG. 3, the components of the velocity of the flow at a point of the probe, FIG. 4, a particular arrangement of the pressure taps of the first embodiment of a probe according to the invention, FIG. 5, a particular arrangement of the pressure taps of the second embodiment of a probe according to the invention, FIG. 6, a fixed multifunction probe according to the invention furthermore -comprising means for measuring the total temperature.

DETAILED DESCRIPTION OF THE INVENTION

Figure 3:
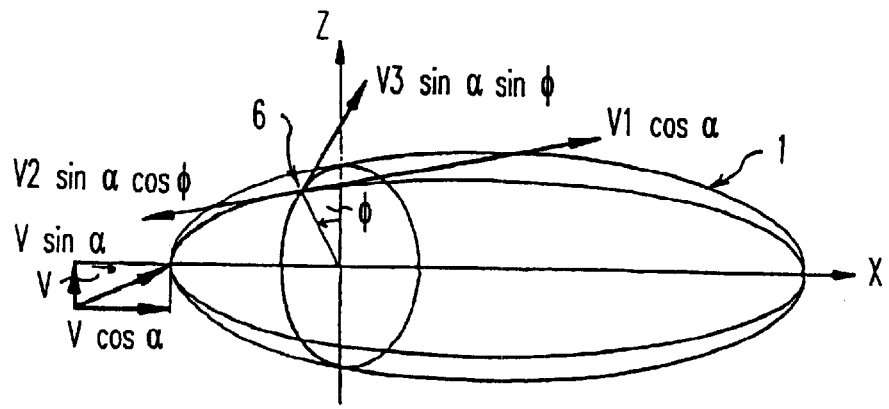

FIG. 1 schematically represents a fixed multifunction probe according to the invention. The probe comprises a body 1, pressure taps 2, pressure measurement means 3 and calculation means 4.

The body 1 exhibits a profile having a symmetry of revolution about a longitudinal axis X. The profile is such that the fluid flow exhibits no separation within the useful range of angle of attack. This range may extend for example between ±40° of angle of attack. The body is closed by a rounded cap 5. The body is placed in the fluid flow. The probe comprises at least three pressure taps 2, each pressure tap tapping a pressure Pe, Pi, Pr. The pressure taps are arranged on the body and communicate via hermetic ducts with pressure measurement means 3. The pressure measurement means are associated with the pressure taps 2 so as to measure at least as many pressures as pressure taps 2. The pressure measurement means consist of differential or absolute pressure sensors C1, . . . , Cn. The outputs P1, . . . , Pn of the sensors are utilized by the calculation means 4. The calculation means 4 can comprise a processor, or a microcontroller, for performing the calculations of the fluid flow parameters, from the measured pressure values P1, . . . , Pn.

FIG. 2 schematically represents, in a diagram, the arrangement of the pressure taps on the body 1 of a probe according to the invention. The probe comprises at least three pressure taps PPe, PPi, PPr such that:

PPe is characterized by its abscissa $x_e$ and its angle $\phi_e$

PPi is characterized by its abscissa $x_i$ and its angle $\phi_i$

PPr is characterized by its abscissa $x_r$ and its angle $\phi_r$

Each pressure tap has a pressure coefficient kP which is expressed according to the relations:

$$kP = \frac{P - Ps_\infty}{Pt - Ps_\infty} \quad (1)$$

$$kP = 1 - V^2 \quad (2)$$

With:

$Ps_\infty$ the static pressure at upstream infinity of the probe,

P the pressure at the relevant tap,

Pt the total pressure of the flow at the level of the probe,

V the velocity of the flow at the level of the relevant tap for a velocity at upstream infinity of the probe equal to unity.

For a relevant pressure tap, the components of the velocity of the fluid flow are represented in FIG. 3. V is the fluid flow velocity at the level of the relevant pressure tap 6 for a velocity at upstream infinity equal to unity. The illustration represents a probe, the profile of whose body 1 is simulated by an ellipse. The abscissa axis X corresponds to the longitudinal axis of the probe. The fluid flow, of velocity $\vec{V}$ and angle of attack α, can be decomposed into two flows, a longitudinal flow and a transverse flow. To the longitudinal flow there corresponds an upstream velocity parallel to the axis of symmetry X of the probe and of modulus V cos α. The induced velocity $\vec{V}1$ cos α, at the relevant point of the surface, is tangential to the meridian at this point. To the transverse flow there corresponds an upstream velocity perpendicular to the axis of symmetry X of the probe and of modulus V sin α. The velocity induced at the relevant point of the surface has a component, of modulus V2 sin αcos φ, tangential to the meridian at this point, and a component, of modulus V3 sin αsin φ, tangential to the circle at the relevant point. φ represents the angular position of the point with respect to the attack plane defined by the axis of symmetry X of the probe and the upstream velocity $\vec{V}$ of the fluid flow. The values V1, V2 and V3 depend solely on the abscissa of the relevant point. The superposition of the longitudinal and transverse flows allows calculation of the velocity V at every point of the probe, in particular at a pressure tap, according to the relation:

$$V^2 = (V1 \cos \alpha + V2 \sin \alpha \cos \phi)^2 + (V3 \sin \alpha \sin \phi)^2 \quad (3)$$

with:

α the angle of attack of the flow,

φ the angular position of the pressure tap with respect to the attack plane,

V1, V2, V3 the components of the velocity at the relevant point, the velocities V1, V2 and V3 are calculated for an upstream infinity velocity equal to unity. The components of the velocity V1, V2, V3 depend only on the abscissa of the pressure tap. They are calculated according to a customary method from the profile of the probe, for example according to the Hess and Smith method.

The expression (2) for the pressure coefficient can be expanded using the formulae: $\cos^2\alpha = \frac{1}{2}(1+\cos 2\alpha)$, $\sin^2\alpha =$ ½(1−cos 2α) and 2 sin α. cos α=sin 2α so as to express the coefficient in the following form:

$$kP = 1 - a - b\cos 2\alpha - c\sin 2\alpha \quad (4)$$

a, b and c being constants which depend only on the position of the pressure tap and the profile of the probe.

The pressure measurement means associated with the pressure taps measure at least as many pressures as pressure taps. A first means is a differential sensor which measures P1=Pe−Pr. A second means is a differential sensor which measures P2=Pi−Pr. A third means is an absolute sensor which measures P3=Pr. This enables the calculation means to calculate the ratio $$\frac{P1 - P2}{P1 + P2}$$

which can be expressed in the following forms:

$$\frac{P1 - P2}{P1 + P2} = \frac{(Pe - Pr) - (Pi - Pr)}{(Pe - Pr) + (Pi - Pr)} \quad (5)$$

$$\frac{P1 - P2}{P1 + P2} = \frac{kPe - kPi}{kPe + kPi - 2 \cdot kPr} \quad (6)$$

This ratio can be written in the form:

$$\frac{P1 - P2}{P1 + P2} = \frac{A + B \cdot \cos 2\alpha + C \cdot \sin 2\alpha}{D + E \cdot \cos 2\alpha + F \cdot \sin 2\alpha} \quad (7)$$

With A, B, C, D, E, F being values dependent solely on the coordinates ($X_e$, $X_i$, $X_n$, $\phi_e$, $\phi_i$, $\phi_r$) of the pressure taps. By suitably choosing these coordinates, it is possible to contrive matters such that A=0, B=0 and F=0 and that E/D has a value such that the ratio $$\frac{P1 - P2}{P1 + P2}$$

is quasi linear with the angle of attack a. For example, for a variation of α of ±400, if E/D=0.560825 then the expression for the ratio as a function of α is linear to within $10^{-3}$.

The calculation of the ratio $$\frac{P1 - P2}{P1 + P2}$$

thus makes it possible to determine the angle of attack α, followed by the pressure coefficients kPe, kPi, kPr, followed by (Pt−$Ps_\infty$), $Ps_\infty$ and Pt.

The system is not however optimized, since the variation in the ratio $$\frac{P1 - P2}{P1 + P2}$$

referred to the useful range of angle of attack a is not as large as possible. Now, this is desirable in order to optimize the accuracy of the calculations.

Figure 4:
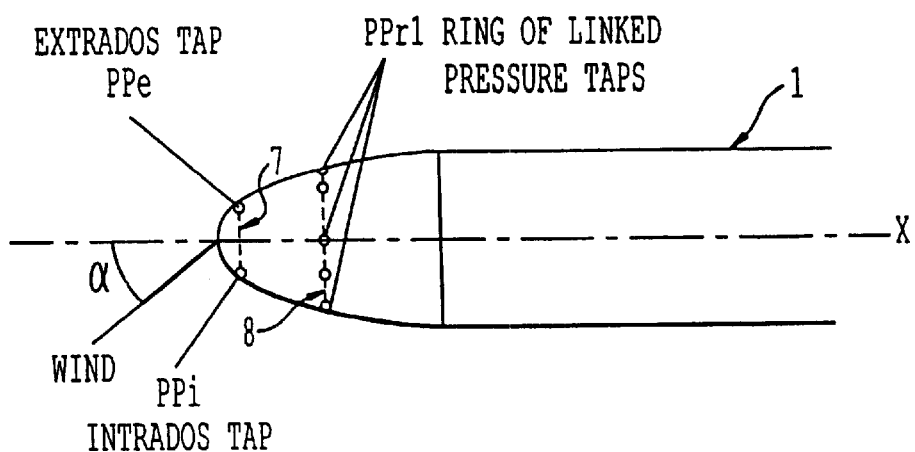

FIG. 4 schematically represents, in a diagram, a - particular arrangement of the pressure taps of the first embodiment of a probe according to the invention. This arrangement allows optimization of the determination of the flow parameters. The position of each of the three pressure taps, PPe, PPi and PPr1, is determined as a function of the profile of the body 1 of the probe in such a way that:

PPe is situated on the extrados of the probe, in a first section 7, preferably perpendicular to the axis of the probe, and in the attack plane PPi is situated on the intrados of the probe, in the same section as PPe and diametrically opposite PPe in the attack plane and the tap PPr1 consists of a ring of intercommunicating holes. The ring is situated in one and the same section 8 preferably perpendicular to the axis of the probe. The holes are preferably regularly spaced over the circumference of this section. When the pressure tap PPr1 comprises eight holes, the latter are preferably positioned at 45° to one another. This particular embodiment corresponds to the illustration of FIG. 4.

The terms extrados and intrados make reference to an installation of the probe along the fuselage. A pressure tap PPe is said to be situated on the extrados of the probe when it lies in the attack plane defined by the axis of the probe and the upstream infinity velocity of the flow, and on the side away from the wind for positive angles of attack. An intrados tap PPi is diametrically opposite an extrados tap.

The extrados pressure taps are characterized by an angle Φ equal to 0. The intrados pressure taps are characterized by an angle Φ equal to π.

In the case of installation on the nose of the airplane, two additional pressure taps may be arranged in the first section in a plane perpendicular to the plane containing the intrados and extrados taps. The four pressure taps of the first section are preferably equidistant from one another.

By knowing the components of the velocity it is possible to calculate the pressure coefficients kPe, kPi and kPr1 which are expressed according to the following relations:

$$kPe = (Pe - Ps_\infty)/(Pt - Ps_\infty) \quad (8)$$

or else:

$$kPe = 1 - (V1 \cos \alpha + V2 \sin \alpha)^2 \text{(since } \Phi = 0\text{)} \quad (9)$$

$$kPi = (Pi - Ps_\infty)/(Pt - Ps_\infty) \quad (10)$$

or else:

$$kPi = 1 - (V1 \cos \alpha - V2 \sin \alpha)^2 \text{(since } \Phi = \pi\text{)} \quad (11)$$

$$kPr1 = (Pr1 - Ps_\infty)/(Pt - Ps_\infty) \quad (12)$$

or else:

$$kPr1 = 1 - (V'1 \cos \alpha)^2 - 0.5(V'2 \sin \alpha)^2 - 0.5(V'3 \sin \alpha)^2 \quad (13)$$

The coefficient kpr1 is calculated by averaging the coefficients of the eight intercommunicating holes forming the tap PPr1.

The components V'1, V'2 and V'3 of the velocity of the fluid flow at the pressure tap PPr1 are different from the components V1, V2 and V3 of the velocity of the flow at the pressure taps PPe and PPi. This is because the pressure tap PPr1 is situated at a different abscissa from that of the pressure taps PPe and PPi.

The pressure coefficients kPe, kPi and kPr1 are periodic functions of the angle of attack α and they are of period π on account of the power of two which comes into relations (9), (11) and (13).

The three pressure sensors C1, C2, C3 are associated with the pressure taps. C1 is a differential sensor which measures P1=Pe−Pr1. C2 is a differential sensor which measures P2=Pi−Pr1. C3 is an absolute sensor which measures P3=Pr1. A different choice may be made for the type (differential/absolute) of sensors.

The calculation means make it possible to calculate the ratio:

$$(P1-P2)/(P1+P2)$$

which is expressed according to the relations:

$$(P1-P2)/(P1+P2)=(Pe-Pi)/(Pe+Pi-2.Pr1) \text{ or else:} \quad (14)$$

$$(P1-P2)/(P1+P2)=(kPe-kPi)/(kPe+kPi-2.kPr1) \quad (15)$$

In view of the expressions for kPe, kPi and kPr1 as a function of α, the ratio (P1−P2)/(P1+P2) can be written in the form:

$$(P1-P2)/(P1+P2)=(a.\sin(2\alpha))/(b+c.\cos(2\alpha)) \quad (16)$$

where a, b and c are constants which depend only on the position of the pressure taps on the probe.

By knowing the ratio (P1−P2)/(P1+P2) it is therefore possible to calculate the angle of attack α. However, relation (16) generally corresponds to a nonlinear function of the angle of attack α as a function of the pressure ratio. For a limited range of angle of attack, this function may be rendered linear by virtue of a judicious choice of the constants a, b and c; that is to say, by virtue of a judicious choice of the position on the probe of the pressure taps. Such a choice makes it possible for example to obtain:

- a mean nonlinearity (square error) of $\pm 10^{-3}$ over a range of angle of attack of ±40° when c/b=0.560825,
- or else a mean nonlinearity (square error) of $\pm 3 \times 10^{-3}$ over a range of angle of attack of ±50° when c/b=0.59998,
- or else a mean nonlinearity (square error) of $\pm 7.5 \times 10^{-3}$ over a range of angle of attack of ±60° when c/b= 0.65422.

The angle of attack being a quasi linear function of the pressure ratio, it can be calculated with good accuracy. The following numerical application illustrates a particular embodiment of the invention; the assumptions of the application are as follows:

- the flight domain of the aircraft extends from 0 to 257 m/s, this corresponding to 500 kt in the measurement system commonly used in aeronautics,
- the domain of angle of attack of the air stream is ±40° over the velocity interval lying between 0 and 103 m/s, this corresponding to 200 kt in the measurement system commonly used in aeronautics, and it decreases with $V^2$ over the velocity interval lying between 103 and 257 m/s, this corresponding respectively to 200 and 500 kt in the measurement system commonly used in aeronautics.

The sensors C1 and C2 have to operate over the interval which extends from −32 to +350 hPa. Taking as another constraint the fact that the sensors C1 and C2 have an accuracy of ±0.25 hPa, the calculation of the angle of attack α, for a velocity of 51 m/s, this corresponding to 100 kt in the measurement system commonly used in aeronautics, is given with an accuracy of:

0.75° for α=±40°

0.5° for α=±30°

0.3° for α=+20°

0.25° for α=+0°

Knowing the angle of attack α, relations (9), (11) and (13) make it possible to calculate the pressure coefficients kPe, kPi and kPr1. Relations (8), (10) and (12) can be combined so as to express the dynamic pressure (Pt−Ps∞), the static pressure Ps∞ and the total pressure Pt.

The dynamic pressure is given by the relation:

$$(Pt-Ps_\infty)=(P1+P2)/(kPe+kPi-2kPr1) \quad (13)$$

The static pressure Ps∞ is given by the relation:

$$Ps_\infty=P3-kPr1(Pt-Ps_\infty) \quad (14)$$

The total pressure is given by the relation:

$$Pt=(Pt-Ps_\infty)+Ps_\infty \quad (15)$$

By replacing the pressure coefficients kPe, kPi and kPr1 in equations (13), (14) and (15) by their value, it is thereby possible to determine the dynamic pressure, the static pressure Ps∞ and the total pressure. The pressures Pe and Pi are obtained by calculating P1+P3 and P2+P3 respectively.

Taking a sensor C3 with a measurement swing of 0 to 1100 hPa, and accuracy ±0.25 hPa, the accuracies in the values calculated for a velocity of 51 m/s, this corresponding to 100 kt in the measurement system commonly used in aeronautics, become:

for the calculated dynamic pressure 0.18 hPa for α=0°

0.28 hPa for α=±40° for the calculated static pressure Ps∞

0.14 hPa for α=0°

0.25 hba for α=±40°

Figure 5:
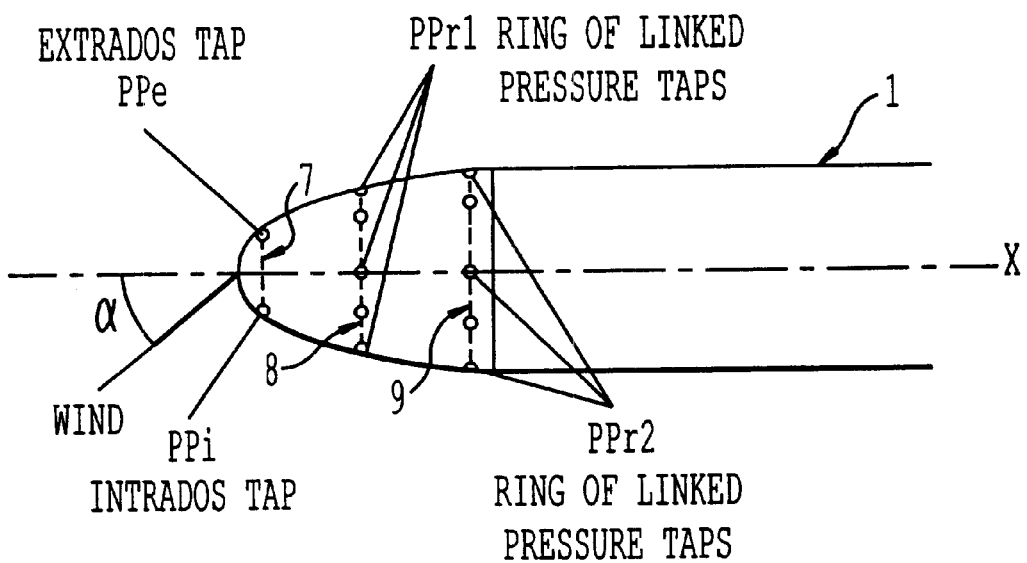

FIG. 5 schematically represents, in a diagram, a particular arrangement of the pressure taps of the second embodiment of a probe according to the invention. The probe comprises, in addition to the pressure taps already described in the first embodiment, a fourth pressure tap PPr2 associated with the pressure measurement means. In the example adopted, the pressure measurement means comprise a fourth pressure sensor C4. The fourth sensor C4 is chosen to be the same type as the third sensor C3.

The pressure tap PPr2 comprises, like the tap PPr1, a ring of intercommunicating holes situated in one and the same section 9. The holes of the tap PPr2 are situated at a different abscissa from that of the holes of the tap PPr1. The abscissa of the holes of the tap PPr2 is chosen in such a way that the pressure coefficient kPr2 is as different as possible from the pressure coefficient kPr1 for the useful range of angle of attack. The data provided by the sensor C4 make it possible to perform monitoring of the validity of the information. This monitoring is carried out as follows:

- a first value of α, of (Pt−Ps∞) and of Ps∞, as well as the value of the pressures Pe and Pi are calculated, as described above, from the information provided by the sensors C1, C2 and C3.
- a second value of α, of (Pt−Ps∞) and of (Ps∞) are calculated, from the calculated values of Pe and Pi and, from the pressure measured by the sensor C4. These second values are compared with the first values of α, of (Pt−Ps∞) and of Ps∞.

The result of the comparison makes it possible to detect a malfunction in one of the measurement pathways.

In the case where the probe comprises four pressure taps in the first section, the two additional taps make it possible to calculate the sideslip of the air flow. This calculation is performed in a similar manner to the calculation of the angle of attack α.

The multifunction probe described above makes it possible to determine the velocity and angle of attack of the air flow on the basis of several pressure taps.

It is known moreover that the actual velocity of the airplane depends on the static temperature Ts of the air flow. This temperature being difficult to measure, the total temperature Tt of the air flow is customarily measured, from which the static temperature Ts is deducted through the following equation:

$$Tt = (1 + 0.2\ M^2)Ts$$

Where M represents the Mach number. The Mach number is the ratio of the velocity of the airplane to the velocity of sound. Now, the velocity of sound Vs is dependent on the static temperature Ts of the air flow:

$$Vs = \sqrt{\gamma \cdot r \cdot Ts}$$

in which equation:

γ is a constant equal to around 1.4 r is the ideal gas constant.

The Mach number is for its part calculated from the static pressure Ps- and from the total pressure Pt which were determined above:

$$M = \sqrt{5\left[\left(\frac{Pt}{Ps\infty}\right)^{2/7} - 1\right]}$$

Thus, the actual velocity of the airplane can be determined from the total pressure Pt, from the static pressure $Ps_\infty$ and from the total temperature Tt.

Separate probes are customarily made, one probe comprising the pressure taps and another comprising means for measuring the total temperature Tt.

Figure 6:
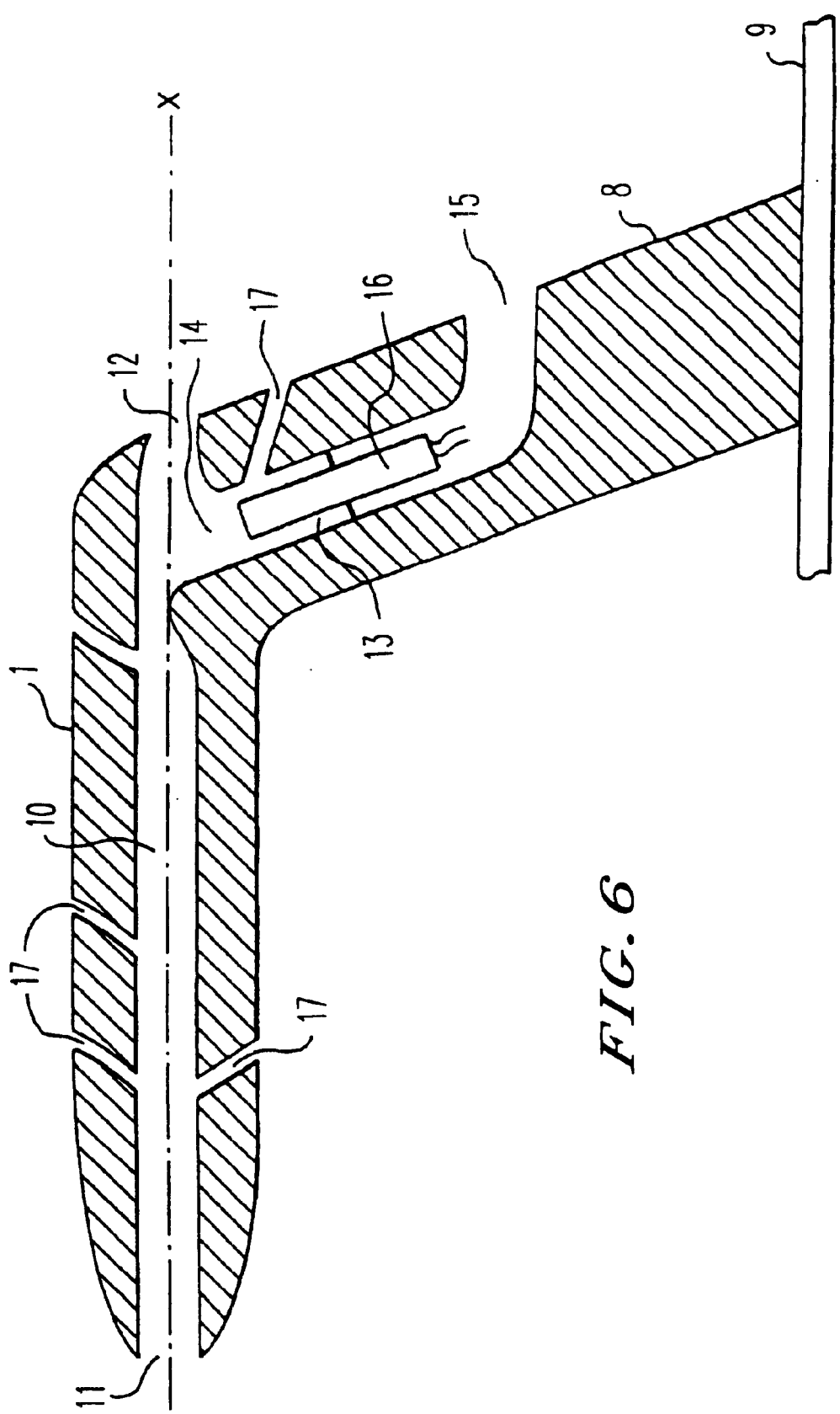

In accordance with the invention, by making a multifunction probe with no Pitot tap, it is advantageous to supplement it with means for measuring the total temperature Tt. An example of such a probe is described by means of FIG. 6.

In this figure, the multifunction probe comprises the body 1 connected to a base 8 offset from the axis X and the function of which is to maintain the position of the body 1 with respect to a skin 9 of the airplane. To simplify the figure, the pressure taps PPr1, PPr2 and PPe are not represented.

The multifunction probe furthermore comprises means for measuring the total temperature of the air flow.

Advantageously, these means comprise two channels, including a first channel 10 comprising an inlet orifice 11 substantially facing the air flow when the latter is oriented along the X axis. The first channel 10 also comprises an outlet orifice 12 allowing air located in the first channel 10 to escape along the direction of the X axis. Any particles which may circulate through the first channel 10 escape without coming into contact with a temperature sensor whose position will be described later. These particles are for example formed of droplets of water or dust.

The second channel 13 comprising means for measuring the total temperature of the air flow includes an inlet orifice 14 opening out into the first channel 10. The second channel 13 is for example substantially perpendicular to the first channel 10. Part of the air circulating through the first channel 10 enters the second channel 13 via the inlet orifice 14 and escapes from the second channel 13 via an outlet orifice 15 opening to the outside toward the rear of the base 8.

The means for measuring the total temperature of the air flow furthermore comprise a temperature sensor 16 situated inside the second channel 13. The temperature sensor 16 comprises for example a coiled platinum-based wire forming an electrical resistor whose value can vary as a function of its temperature. The temperature is sensor 16 is fixed in the second channel 13 so as to avoid, to the greatest possible extent, any heat transfer between the structure of the second channel 13 and the temperature sensor 16.

The two channels 10 and 13 are contrived in such a way that the air originating from the air flow circulates through the second channel 13 at low velocity. This velocity must be much less than the velocity of sound in the flow while being non zero so as to prevent the temperature sensor 16 from taking up the temperature of the structure of the base 8 and in particular the temperature of the structure of the two channels 10 and 13.

Specifically, when the aircraft is flying at high altitude, the temperature of the air flow may be much less than zero degrees Celsius, this incurring a risk of ice formation on the multifunction probe. The ice may in particular obstruct these channels 10 and 13 and hence prevent any correct measurement of temperature.

To preclude the formation of ice, the moveable blade 1 comprises de-icing means which include for example an electrical heating resistor arranged in the structure of the blade. These de-icing means heat up the multifunction probe and consequently the air circulating through the two channels 10 and 13. To prevent the heating up of the air from disturbing the temperature measurement, there are provided orifices 17 for removing the boundary layer of the air circulating through the two channels 10 and 13.

What is claimed is:

1. A fixed multifunction probe for aircraft for measuring flow parameters of fluid flowing with respect to the probe, comprising:

a body having symmetry of revolution about a longitudinal axis, closed by a rounded cap, the body being placed in the fluid flow, at least three pressure taps situated at specified positions of the body and distributed in plural sections so as to tap at least a first pressure, a second pressure, and a third pressure, pressure measurement means associated with the pressure taps for measuring at least as many pressures as pressure taps, calculation means for calculating a local angle of attack α of the fluid flow by expressing a specified ratio of measured pressures as a function of the local angle of attack α in a form:

$$\frac{P1 - P2}{P1 + P2} = \frac{A + B \cdot \cos 2\alpha + C \cdot \sin 2\alpha}{D + E \cdot \cos 2\alpha + F \cdot \sin 2\alpha}$$

A, B, C, D, E, F being constants dependent solely on coordinates of the pressure taps, the specified positions of the pressure taps being such that the specified ratio as a function of the local angle of attack α is quasi linear, and the calculation means for calculating a total pressure Pt of the fluid flow at a level of the probe, a static pressure at upstream infinity of the probe $Ps_\infty$, and dynamic pressure $Pt - Ps_\infty$ from pressure coefficients kP of the pressure taps.

2. The fixed multifunction probe as claimed in claim 1, wherein each section is perpendicular to the longitudinal axis of the body of the probe.

3. The fixed multifunction probe as claimed in claim 2, wherein the three pressure taps are distributed as:

two pressure taps arranged in a first section and arranged in a plane of attack and diametrically opposite one another to tap the first pressure and the second pressure;

a reference pressure tap arranged in a second section and including a ring of regularly spaced holes intercommunicating to establish a first mean pressure.

4. The fixed multifunction probe as claimed in claim 3, further comprising:

a fourth pressure tap arranged in a third section, separate from the first and the second sections, and including a ring of regularly spaced holes intercommunicating to establish a second mean pressure, and wherein the calculation means calculates a second value of the local angle of attack $\alpha$, of the dynamic pressure $Pt-Ps_\infty$ and of the static pressure $Ps_\infty$ to validate the calculated values by comparison.

5. The fixed multifunction probe as claimed in claim 4, wherein the fourth pressure tap comprises eight holes separated from one another by an angle of 45°.

6. The fixed multifunction probe as claimed in claim 3, wherein the pressure tap arranged in the second section comprises eight holes separated from one another by an angle of 45°.

7. The fixed multifunction probe as claimed in claim 3, wherein the pressure measurement means measures a first differential pressure $P1=Pe-Pr1$ and a second differential pressure $P2=Pi-Pr1$ between the first and the second sections, and an absolute pressure $P3-Pr1$ at a level of the reference tap.

8. The fixed multifunction probe as claimed in claim 7, wherein the calculation means calculates the flow parameters from the relations:

$$(P1-P2)/(P1+P2)=(a \cdot \sin(2\alpha)/(b+c \cdot \cos(2\alpha)),$$

in which a, b, and c are constants dependent solely on the positions of the pressure taps on the probe, $$(Pt-P_\infty)=(P1+P2)/(kPe+kPi-2kPr1),$$

in which $kPe=1-(V1 \cos \alpha+V2 \sin \alpha)^2$, $kPi=1-(V1 \cos \alpha-V2 \sin \alpha)^2$, $kPr1=1-(V'1 \cos \alpha)^2 0.5(V'2 \sin \alpha)^2-0.5(V'3 \sin \alpha)^2$, and V1, V2, and V3 are components of a velocity of the fluid flow at a level of the first section, and V'1, V'2, and V'3 are components of a velocity of the fluid flow at a level of the second section, $$Ps_\infty=P3-kPr1(Pt-Ps_\infty), \text{ and}$$

$$Pt=(Pt-Ps_\infty)+Ps_\infty.$$

9. The fixed multifunction probe as claimed in claim 1, further comprising means for measuring a total temperature of an air flow as the fluid flow.

10. The probe as claimed in claim 9, wherein the means for measuring the total temperature comprises:

a first channel comprising an air inlet orifice substantially facing the air flow and an air outlet orifice;

a second channel whose air inlet is situated in the first channel; and a temperature sensor fixed in the second channel.

11. The probe as claimed in claim 10, wherein the two channels comprise a plurality of orifices configured to remove toward the outside of the probe, the boundary layer of the air circulating through the channels.

* * * * *